United States Patent
Lim

(10) Patent No.: US 8,373,712 B2
(45) Date of Patent: Feb. 12, 2013

(54) METHOD, SYSTEM AND COMPUTER-READABLE RECORDING MEDIUM FOR PROVIDING IMAGE DATA

(75) Inventor: Seung Phill Lim, Yongin-si (KR)

(73) Assignee: NHN Corporation, Seongnam-si (KR)

( * ) Notice: Subject to any disclaimer, the term of this patent is extended or adjusted under 35 U.S.C. 154(b) by 615 days.

(21) Appl. No.: 12/618,359

(22) Filed: Nov. 13, 2009

(65) Prior Publication Data

US 2010/0118040 A1    May 13, 2010

(30) Foreign Application Priority Data

Nov. 13, 2008   (KR) .................. 10-2008-0112996

(51) Int. Cl.
| | |
|---|---|
| G06T 15/00 | (2011.01) |
| G09G 5/22 | (2006.01) |
| G09G 5/00 | (2006.01) |
| G06K 9/20 | (2006.01) |
| G06K 9/32 | (2006.01) |
| G06K 9/60 | (2006.01) |
| G06K 9/03 | (2006.01) |
| G06F 7/00 | (2006.01) |
| G06F 17/00 | (2006.01) |
| G06F 3/048 | (2006.01) |
| G06F 3/00 | (2006.01) |

(52) U.S. Cl. ........ 345/531; 345/522; 345/619; 345/659; 345/689; 345/551; 382/282; 382/296; 382/305; 382/311; 701/409; 701/461; 707/705; 707/758; 707/771; 715/200; 715/273; 715/700; 715/764

(58) Field of Classification Search .................. 345/581, 345/418, 619, 649–650, 659, 678, 689, 522, 345/531, 538, 548, 551; 382/176–177, 209, 382/214, 216–219, 282, 286, 289–296, 305, 382/311; 701/409–411, 430, 461, 705–707, 701/758, 769

See application file for complete search history.

(56) References Cited

U.S. PATENT DOCUMENTS

| | | | |
|---|---|---|---|
| 5,642,434 | A | 6/1997 | Nakao |
| 5,995,663 | A | 11/1999 | Itsuzaki |
| 6,504,571 | B1 * | 1/2003 | Narayanaswami et al. .................. 348/231.99 |
| 2008/0143727 | A1 | 6/2008 | Oh |
| 2008/0268876 | A1 * | 10/2008 | Gelfand et al. ............... 455/457 |
| 2009/0327078 | A1 * | 12/2009 | Ohazama et al. .......... 705/14.54 |
| 2010/0057571 | A1 * | 3/2010 | Yamamoto et al. ........ 705/14.58 |
| 2010/0114888 | A1 * | 5/2010 | Van Zwol et al. ............ 707/737 |
| 2010/0241507 | A1 * | 9/2010 | Quinn et al. ............... 705/14.42 |

* cited by examiner

*Primary Examiner* — Wesner Sajous
(74) *Attorney, Agent, or Firm* — H.C. Park & Associates, PLC

(57) ABSTRACT

The present disclosure relates to a method, system and computer-readable medium for providing image data. According to an exemplary embodiment, a method of providing image data includes storing a particular region on image data in association with a keyword, comparing conditional information with the keyword associated with the particular region, when receiving the conditional information from a user terminal unit, and controlling a display state of the image data to allow the particular region to be displayed on a screen of the user terminal unit. When a user inputs a keyword including content relating to a geographical feature or object, an actual shape of the geographical feature or object can be displayed on a screen of the user terminal unit.

13 Claims, 5 Drawing Sheets

METHOD, SYSTEM AND COMPUTER-READABLE RECORDING MEDIUM FOR PROVIDING IMAGE DATA

CROSS REFERENCE TO RELATED APPLICATION

This application claims priority from and the benefit of Korean Patent Application No. 10-2008-0112996, filed on Nov. 13, 2008, which is hereby incorporated by reference for all purposes as if fully set forth herein.

BACKGROUND OF THE INVENTION

1. Field of the Invention

Exemplary embodiments of the present invention relate to a method, system and computer-readable recording medium for providing image data. More particularly, exemplary embodiments of the present invention relate to a method, system and computer-readable recording medium that can store image data in association with orientation information and provide information of a region associated with a direction corresponding to a search keyword is when a user inputs the search keyword to search for image data.

2. Discussion of the Background

With recent increase in use of the Internet and distribution of global positioning system (GPS) receivers, geographical information such as maps and the like is supplied to a user generally in the form of digital data which replaces traditional printed matter such as books or the like.

Digital geographical information is generally supplied through an electronic map service via the Internet, a navigation system equipped to vehicles, and the like. Advantageously, the digital geographical information is often coupled to a user interface module having a retrieval function to provide various conveniences to a user. Further, when there is a need to change the geographical information, it can be easily updated through remote operation or the like, so that the digital geographical information is preferable to conventional printed matter because it can be easily kept current and up-to-date.

Conventionally, however, service providers for digital geographical information provide electronic map screens coupled to retrieval interfaces and operated to display a simple combination of marks. Since information displayed on the electronic map screens is remarkably different from an actual image of a place corresponding to the information, it is difficult to confirm the actual image of the corresponding place based on the information.

Therefore, in an attempt to solve such a problem, US Patent Application Publication No. 2008-0143727, filed on Nov. 8, 2007 and published on Jun. 19, 2008, discloses a technique for an electronic map service, which provides a panoramic image, corresponding to a particular place on an electronic map, to a user. Accordingly, the user can confirm an actual image of the particular place on the electronic map based on the panoramic is image.

Generally, a panoramic picture is generated by connecting several partitioned pictures to each other and provides an image that allows a person to see a wide view extending in the lateral direction. Accordingly, considering the current technical state of display devices such as monitors and the like, it is difficult to regenerate the whole image of the panoramic picture with a suitable resolution on a user terminal unit.

For such reasons, service providers of panoramic pictures may allow only part of the panoramic picture to be preferentially displayed on the user terminal unit rather than allowing the entirety of the panoramic picture to be displayed thereon, such that a desired region of the panoramic picture is displayed on the screen of the terminal unit in response to an input signal through a mouse or the like under user control.

Accordingly, even with the technique disclosed in US Patent Application Publication No. 2008-0143727, a conventional system does not provide a target region of the panoramic picture, which includes a geographical feature or object a user wishes to confirm, such that the target region is immediately displayed on the user terminal unit, and requires the user to adjust the screen so as to display the target region of the panoramic picture after searching for a certain region of the panoramic picture.

Such a problem of the conventional system causes user inconvenience in the case where the user does not have any information about the geographical feature or object that the user wishes to confirm.

SUMMARY OF THE INVENTION

Exemplary embodiments of the present invention provide solutions for the is problems described above.

Exemplary embodiments of the present invention also provide a way to allow a user to confirm an actual image of a selected place based on information of the place displayed on an electronic map by providing image data through an electronic map service.

Exemplary embodiments of the preset invention also provide a way to allow a geographical feature or object, which a user wishes to confirm, to be immediately displayed on a screen of a user terminal unit when the user searches for image data relating thereto.

Additional features of the invention will be set forth in the description which follows, and in part will be apparent from the description, or may be learned by practice of the invention.

An exemplary embodiment of the present invention discloses a method of providing image data, including storing a particular region of image data in association with a keyword, comparing conditional information with the keyword associated with the particular region, when receiving the conditional information from a user terminal unit, and controlling a display state of the image data to allow the particular region to be displayed on a screen of the user terminal unit.

An exemplary embodiment of the present invention also discloses a method of generating an association relation between image data associated with an electronic map and a keyword, including acquiring or setting orientation information of a particular pixel column constituting image data, acquiring region information of an electronic map, where the region information is associated with the image data, acquiring identification information of at least one geographical feature or object by using the region information and the orientation information, and storing the particular pixel column in association with a keyword related to the identification is information of the geographical feature or object.

An exemplary embodiment of the present invention also discloses a system for providing image data, including a keyword matching module that stores a particular region of image data in association with a keyword, and a user interface module that compares conditional information with the keyword associated with the particular region when receiving the conditional information from a user terminal unit, and controls a display state of the image data to allow the particular region to be displayed on a screen of the user terminal unit.

An exemplary embodiment of the present invention also discloses a system for generating an association relation between image data associated with an electronic map and a keyword, including an orientation information setting module that acquires or sets orientation information of a particular pixel column constituting image data, and a keyword matching module that acquires region information of an electronic map, where the region information is associated with the image data, and that acquires identification information of at least one geographical feature or object by using the region information and the orientation information, and that stores the particular pixel column in association with a keyword related to the identification information of the geographical feature or object.

An exemplary embodiment of the present invention also discloses a non-transitory computer-readable medium including an executable program which, when executed, performs the steps of storing a particular region of image data in association with a keyword, comparing conditional information with the keyword associated with the particular region, when receiving the conditional information from a user terminal unit, and controlling a display state of the image data to allow the particular region to be displayed on a screen of the user terminal unit.

An exemplary embodiment of the present invention also discloses a non-transitory is computer-readable medium including an executable program which, when executed, performs the steps of acquiring or setting orientation information of a particular pixel column constituting image data, acquiring region information of an electronic map, where the region information is associated with the image data, acquiring identification information of at least one geographical feature or object by using the region information and the orientation information, and storing the particular pixel column in association with a keyword related to the identification information of the geographical feature or object.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
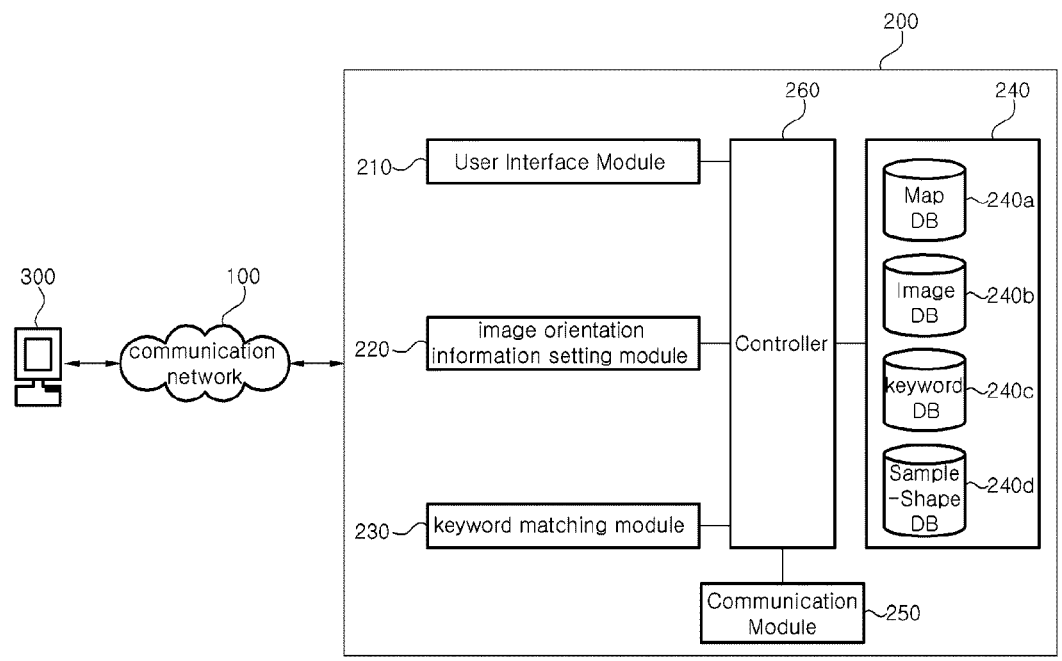
FIG. 1 is a block diagram of an overall system for providing an electronic map service in accordance with an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Exemplary embodiments of the present invention will now be described in detail with reference to the accompanying drawings. The following embodiments are given by way of illustration to provide a thorough understanding of the invention to those skilled in the art. Hence, it should be understood that the embodiments of the present disclosure are different from each other but are not exclusive with respect to each other. For example, certain shapes, configurations and features disclosed herein may be realized by other embodiments without departing from the spirit and scope of the invention. Further, it should be understood that positions and arrangement of individual components in each of the embodiments may be is changed without departing from the spirit and scope of the invention.

Therefore, the following detailed description should not be construed to limit the claims to the specific embodiments, but should be construed to include all possible embodiments along with the full scope of equivalents to which such claims are entitled.

Hereinafter, exemplary embodiments of the present invention will be described in detail with reference to the accompanying drawings to allow a person having ordinary knowledge in the art to easily implement the present disclosure.

Configuration of Overall System

FIG. 1 is a block diagram of an overall system for providing an electronic map service in accordance with an exemplary embodiment of the present invention.

Referring to FIG. 1, the system according to an exemplary embodiment may include a communication network 100, a map service system 200 for providing an electronic map service, and a user terminal unit 300.

The communication network 100 may be constructed in any form, such as local area network (LAN), metropolitan area network (MAN), wide area network (WAN), and the like, so as to realize wired or wireless communication without being limited to a particular mode. In this exemplary embodiment, the communication network 100 may refer to the World Wide Web (WWW).

In an exemplary embodiment, the map service system 200 may provide map data including geographic information to the user terminal unit 300.

Further, the map service system 200 may associate a point or region on the map data with image data and provide the image data associated with the point or region to the user terminal unit 300 when the point or region on the map data is selected from the user terminal unit 300.

Further, the map service system 200 may acquire orientation information corresponding to each of the pixel columns constituting image data and, in some cases, may recognize a shape, which appears on the pixel column, based on the orientation information.

Further, in an exemplary embodiment, the map service system 200 may display, on the user terminal unit 300, a region of image data including a geographical feature or object corresponding to conditional information, such as a search keyword input by a user. The map service system may accomplish this by comparing the conditional information with the keyword associated with the region. The region of image data may include at least one pixel column.

According to an exemplary embodiment, the user terminal unit 300 is a digital device that allows a user to access and communicate with the map service system 200. Any digital device such as a personal computer (for example, a desktop computer, notebook computer, and the like), a work station, a personal digital assistant (PDAs), a tablet PC, a mobile phone, and the like may be used as the user terminal unit 300 so long as such device includes a memory and a microprocessor for operation capability.

Next, main components and functions of the respective components of the map service system 200 will be described.

Referring to FIG. 1, the map service system 200 according to one embodiment may include a user interface module 210, an orientation information setting module 220, a keyword matching module 230, a database management module 240, a communication module 250, and a controller 260.

According to an exemplary embodiment, at least one of the user interface module 210, orientation information setting module 220, keyword matching module 230, database is management module 240, communication module 250, and controller 260 may be program modules that communicate with the user terminal unit 300.

The program modules may be included in the map service system 200 in the form of operating systems, application program modules, and other program modules, and may be physically stored in several well known storages. Further, the program modules may be stored in a remote storage that can communicate with the map service system 200. The program modules include, but are not limited to, routines, sub-routines, programs, objects, components, and data structures, which perform particular operations or particular data patterns as described below.

Herein, the term "image data" will be used to indicate an image associated with coordinates or a particular region on an electronic map unless otherwise specified. However, it should be noted that this term is used to aid in understanding of the invention but should not be interpreted to limit the invention The user interface module 210 according to an exemplary embodiment provides an interface which allows the user terminal unit 300 to browse map data and image data. The user interface module 210 controls the display state of the map data and/or image data by determining a region of the map data and/or image data that is to be displayed on the user terminal unit 300, and determining a region of the map data and/or image data excluding the region to be displayed. The user interface module 210 then displays, on the user terminal unit 300, the region to be displayed. The user interface module 210 may include a search function to allow a user to search for a particular region on a map by inputting a search keyword, a display screen control function which allows a user to enlarge, reduce and move a map screen image, a data search function which allows a user to search for image data associated with a particular region of an electronic map displayed on the user terminal unit 300, and a data scroll function is which allows a user to change a displayed region of image data provided to the user terminal unit 300 or to scroll the image data thereon.

Further, the user interface module 210 may receive image data from the user terminal unit 300 and store the received image data in association with a particular region on the electronic map. For example, the user interface module 210 may provide an interface which allows a user to designate or select the particular region on the map and then upload image data associated with the particular region through the user terminal unit 300, and may store the uploaded image data in association with the particular region in an image database (DB) 240b described below.

Further, when image data associated with a certain region is present on an electronic map which is being searched by a user, the user interface module 210 may provide information about the image data to the user terminal unit 300 in the form of icons or items, and allow the image data to be provided to the user terminal unit 300 when the user selects any of the icons or items.

Next, in an exemplary embodiment, the orientation information setting module 220 may acquire orientation information corresponding to each of the pixel columns constituting the image data stored in the image DB 240b.

In one embodiment, the keyword matching module 230 may match a certain pixel column of image data with a keyword, which may include identification information such as a name of a certain geographic feature or object, using the orientation information acquired by the orientation information setting module 220.

The database management module 240 according to an exemplary embodiment may include a map DB 240a, which stores map data, the image DB 240b, which stores image is data associated with regions on the electronic map, a keyword DB 240c, which stores information regarding associations between keywords and the image data stored in the image DB 240b, and a sample-shape DB 240d, which stores information of sample shapes used for image matching.

The communication module 250 according to an exemplary embodiment enables communication between the map service system 200 and external devices such as the user terminal unit 300 and the like.

According to an exemplary embodiment, the controller 260 controls a data flow among the user interface module 210, the orientation information setting module 220, the keyword matching module 230, the database management module 240, and the communication module 250. In other words, the controller 260 controls the data flow from the exterior or between the respective components of the map service system 200 to allow the user interface module 210, the orientation information setting module 220, the keyword matching module 230, the database management module 240 and the communication module 250 to perform inherent functions thereof.

In the above description, the database which stores information for realizing the embodiments of the present disclosure includes four types of databases, that is, the map DB 240a, the image DB 240b, the keyword DB 240c, and the sample-shape DB 240d. However, it should be noted that the structure of the database including this classification can be varied as needed.

Moreover, it should be understood that the term "database" is used herein as a concept including not only a narrow sense of a database, but also a broad sense of a database including data records and the like based on computer file systems, and that even a collection of is simple processing results may also be included in the database according to the embodiments of the disclosure so long as certain data can be extracted from the collection by searching for the data from the collection.

Association of Map Data with Image Data

In an exemplary embodiment, a particular region on an electronic map provided by the map service system 200 may be associated with image data stored in the image DB 240b. For example, certain coordinates (x, y) on the electronic map may be associated with image data A stored in the image DB 240*b*. Accordingly, when the certain coordinates (x, y) are included in a regional map image displayed on the user terminal unit 300, an icon indicating that image data associated with the coordinates is present can also be displayed. Then, when a user clicks or otherwise selects the icon, the image data A may be provided to the user terminal unit 300.

Image data to be stored in the image DB 240*b* may be generated or stored by an administrator or user of the map service system 200. In the latter case, the user may upload image data related to a particular geographical feature or object to the map service system 200 after selecting or designating the particular geographical feature or object on the electronic map, so that the uploaded image data can be stored in association with coordinate information on the electronic map in the image DB 240*b*.

Figure 2:
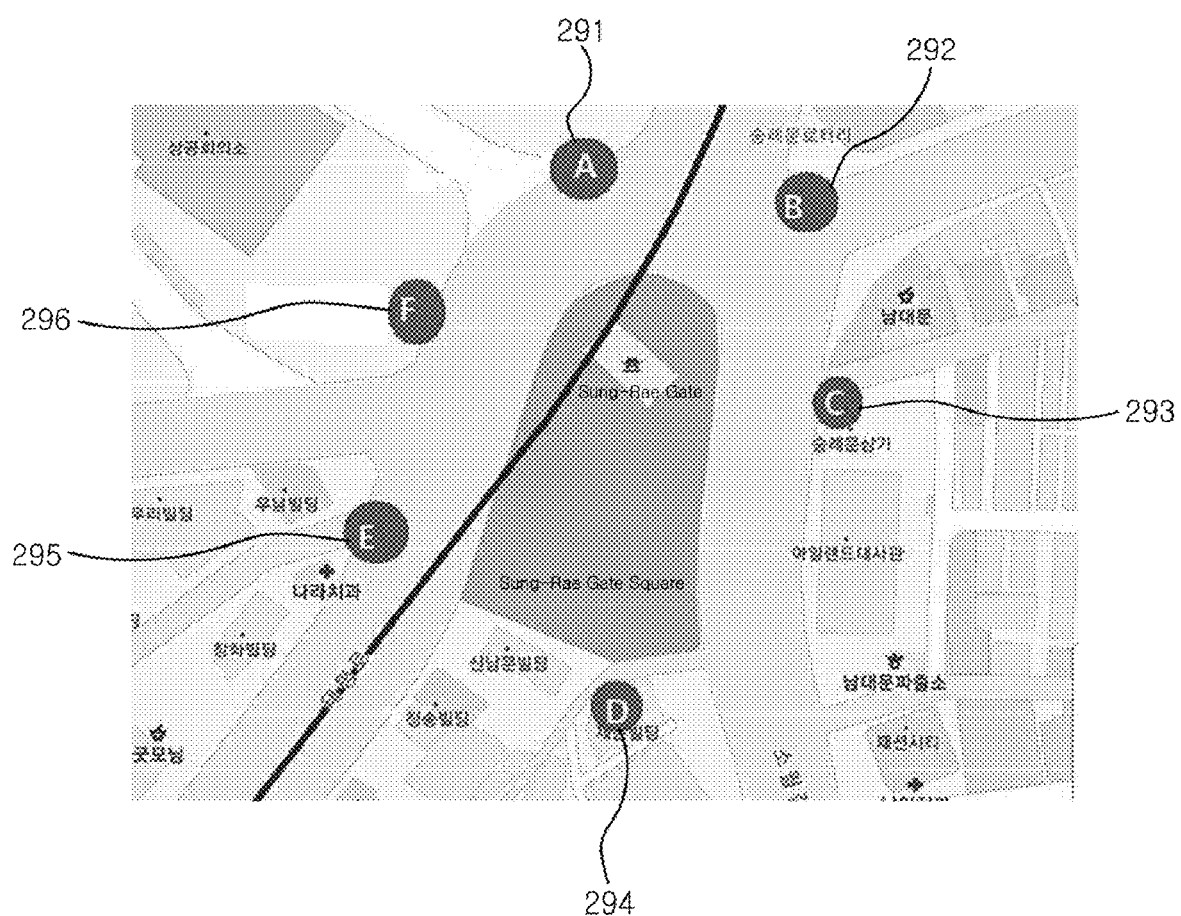
FIG. 2 shows one example of an electronic map including icons associated with image data and displayed on a user terminal unit in accordance with an exemplary embodiment of the present invention.

FIG. 2 shows one example of an electronic map including icons associated with image data and displayed on the user terminal unit 300 in accordance with one embodiment of the present disclosure.

Referring to FIG. 2, a regional map image around Sung-Rae Gate, in Seoul, is shown as displayed on the user terminal unit 300. In FIG. 2, the regional map image includes six icons 291, 292, 293, 294, 295, and 296, each of which is associated with image data captured is at a place where the corresponding icon is located. When a user clicks or otherwise selects a certain icon, image data associated with the icon may be provided to the user terminal unit 300.

Orientation Information Setting of Image Data

According to an exemplary embodiment, if image data is generated using photographic devices such as cameras, the image data may be stored in association with central orientation information. The central orientation information may include information regarding a direction in which the image data is captured, including azimuth information. For example, assuming that the central orientation information is set to 0 degrees when certain image data is captured in the north direction, the east, the south, and the west may be expressed by 90, 180, and 270 degrees, respectively. Such central orientation information will generally correspond to a pixel column located at a central region of the image data.

Particularly, since it is difficult to determine a central region of image data for a panoramic image generated using a plurality of image data, it may be useful to include information about the pixel column to which the central orientation information corresponds.

In an exemplary embodiment, the central orientation information may be directly input by an administrator or user of the map service system 200 or may be obtained by generating image data using a digital photographic device which has a function for calculating the central orientation information.

In an exemplary embodiment, image data may be stored in association with viewing angle information. Herein, the term "viewing angle information" means an angle between a straight line drawn in a direction of a point on the electronic map corresponding to a left border line of the image data and a straight line drawn in a direction of a point on the electronic map corresponding to a right border line of the image data, with reference to a point is where the image data is captured. Such viewing angle information may be determined according to characteristics of the photograph device. Particularly, for a certain panoramic image, the viewing angle information may be determined according to a range of capturing individual images that are used to generate the panoramic image.

In an exemplary embodiment, the orientation information setting module 220 may calculate a unit pixel column angle using the viewing angle information associated with the image data. Herein, the term "the unit pixel column angle" means a difference in azimuth between two adjacent pixel columns among pixel columns constituting the image data. More specifically, the orientation information setting module 220 can calculate the unit pixel column angle by counting the total number of pixel columns constituting the image data and dividing a viewing angle of target image data by the total number of pixel columns. For example, when certain image data has a viewing angle of 360 degrees, the unit pixel column angle is obtained by dividing 360 by the total number of pixel columns.

Then, the orientation information setting module 220 can acquire orientation information of each of the pixel columns constituting the image data by using the orientation information associated with the image data and the calculated unit pixel column angle. Here, the term "orientation information of the pixel column" means information that is provided by extending the concept of the central orientation information of the image data to the respective pixel columns and may include information about directions of the respective pixel columns. More specifically, it may be contemplated that the orientation information corresponding to the respective pixel columns is increased or decreased by the unit pixel column angle at each time when the number of pixel columns increases or decreases by one pixel column in a right or left direction with reference to a particular pixel column corresponding to the central orientation is information of the image data.

Figure 3:
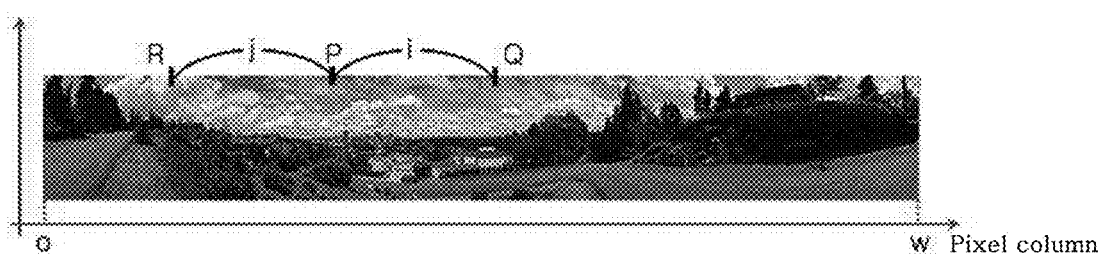
FIG. 3 shows one example of an image obtained by a process of acquiring orientation information about respective pixel columns constituting image data.

FIG. 3 shows one example of an image obtained by a process of acquiring orientation information about respective pixel columns constituting image data.

Referring to FIG. 3, it is assumed that captured image data is a panoramic image having a viewing angle of 360 degrees, a pixel column P as a central pixel column of the image data has orientation information of 90 degrees, and the total number of pixel columns is "w." Then, orientation information of a pixel column Q, which is the i-th pixel column in the right direction from the pixel column P, has a value of $\{90+(360/w)*i\}$ degrees. Further, orientation information of a pixel column R, which is the j-th pixel column in the left direction from the pixel column P, has a value of $\{90-(360/w)*j\}$ degrees. Here, the value of the calculated orientation information can be adjusted to be in the range of 0 degrees to 360 degrees by subtracting 360 degrees from the orientation information when the orientation information has a value of 360 degrees or more, or by adding 360 degrees thereto when the orientation information has a value less than 0 degrees.

Association of Orientation Information with Keyword

In an exemplary embodiment, the keyword matching module 230 may store, in the keyword DB 240*c*, names of geographical features or objects on a certain electronic map in association with orientation information of pixel columns acquired by the orientation information setting module 220.

In one embodiment, the keyword matching module 230 may recognize a shape appearing in certain image data and store identification information of the recognized shape in association with orientation information of a pixel column where the shape is located.

As a technique for recognizing a shape included in an image, it is possible to refer is to an invention disclosed in Korean Patent Application No. 1995-566 (Korea Patent Laid-open Publication No. 1995-23966 published on Aug. 18, 1995), entitled "shape detecting device" and filed on Jan. 14, 1995 claiming priority to Japanese Patent Application No. 1994-3333 of Matsushita Electric Industrial Co., Ltd. (Korean Patent Application No. 1995-566, and U.S. Pat. No. 5,995,663, issued on Nov. 30, 1999, which corresponds to Korean Patent Application No. 1995-566, should each be considered to be incorporated herein by reference in its entirety). According to this technique, the shape detecting device outputs image information of an object after photographing the object, digitizes the output image information to store the digitized image information as image data, determines an approximate position of the corresponding image, and detects edge points of the image based on the degree of shading of the image to deduce a borderline of the image.

Further, it is possible to refer to an invention disclosed in Korean Patent Application No. 1994-16927 (Korea Patent Laid-open Publication No. 1995-5034 published on Feb. 18, 1995), entitled "shape detecting method" and filed on Jul. 14, 1994 claiming priority to Japanese Patent Application Nos. 1993-174134 and 1993-194355 of Matsushita Electric Industrial Co., Ltd. (Korean Patent Application No. 1994-16927, and U.S. Pat. No. 5,642,434, issued on Jun. 24, 1997, which corresponds to Korean Patent Application No. 1994-16927, should each be considered to be incorporated herein by reference in its entirety). According to this method, even in the case where there is a region on an image where the degree of shading remarkably changes excluding a detection target, the image is divided into a number of unit pixels to calculate a correlation value of partial shades, thereby achieving accurate detection of the target in the image.

In an exemplary embodiment, the above and other techniques for recognizing is shapes may be applied to recognition of buildings and objects included in the image data and to extraction of information thereabout.

More specifically, the sample-shape DB 240d may store sample shape image data in association with identification information about a shape appearing in the sample shape image data, and the keyword matching module 230 may recognize the shape by comparing the shape with the sample-shape image data stored in the sample-shape DB 240d.

When the shape appearing in the image data is recognized, based on the keyword the keyword matching module 230 determines the identification information of the recognized shape and stores it in the keyword DB 240c, in association with the orientation information of the pixel column where the recognized shape is located.

In another exemplary embodiment, the keyword matching module 230 may determine keywords corresponding to pixel columns of image data using electronic map data stored in the map DB 240a, and may store such pixel columns in association with such keywords. The keyword matching module 230 may generate an association relation between image data associated with an electronic map and a keyword. To generate this association relation, the keyword matching module 230 may acquire orientation information of a particular pixel column constituting image data, and may acquire region information of an electronic map, where the region information is associated with the image data. Using the region information and orientation information, the keyword matching module 230 may acquire identification information of a geographical feature or object, and may store the particular pixel column in association with a keyword related to the identification information of the geographical feature or object. The orientation information may be acquired by the keyword matching module 230 from the orientation information setting module 220 which itself may have acquired or set the orientation information.

More specifically, the keyword matching module 230 may generate association relations between pixel columns and keywords by acquiring names of geographical features or objects, present on orientation information of the respective pixel columns of the image data with reference to coordinates associated with the image data, from map data including the coordinates on the electronic map associated with the image data.

Referring again to FIG. 2, for image data (not shown) associated with an icon "C" 293, it can be confirmed that "Sung-Rae Gate" is in the western direction from the icon "C" 293. Thus, it may be contemplated that, among pixel columns of image data (not shown) associated with the icon "C" 293, a pixel column having orientation information of 270 degrees and pixel columns adjacent thereto are associated with the keyword, "Sung-Rae Gate".

In another exemplary embodiment, the keyword matching module 230 may determine a keyword corresponding to a certain pixel column of the image data using the shape recognition technique and the electronic map data together.

More specifically, the keyword matching module 230 acquires the names of the geographical features or objects, present on the orientation information of the respective pixel columns of the corresponding image data with reference to the coordinates associated with the image data, from the map data including the coordinates on the electronic map associated with the image data, and then acquires sample shape data, including the names of the geographical features or objects as the shape identification information, from the sample-shape DB 240d. Then, the keyword matching module 230 may compare images, which appear on the corresponding pixel columns, with the extracted sample shape data, and may store the shape identification information of the sample shape data in association with the corresponding pixel columns, if similarity between the images appearing on the corresponding pixel columns and the extracted sample shape data is a sufficient degree or more.

Referring again to FIG. 2, for image data (not shown) associated with an icon "D" 294, it can be confirmed that "Sung-Rae Gate" and "Sung-Rae Gate Square" are in the northern direction from the icon "D" 294. Thus, the keyword matching module 230 may determine, as candidate keywords, "Sung-Rae Gate" and "Sung-Rae Gate Square" for a pixel column having orientation information of 180 degrees and pixel columns adjacent thereto among pixel columns of image data (not shown) associated with the icon "D" 294. Then, the keyword matching module 230 may determine a more suitable keyword corresponding to a more suitable pixel column by image matching between images appearing on the corresponding pixel images and sample shape data having "Sung-Rae Gate" as shape identification information and with sample shape data having "Sung-Rae Gate Square" as shape identification information.

In another exemplary embodiment, the keywords associated with particular pixel columns of image data may be directly input by an administrator or user of the map service system 200. In this case, the sample-shape DB 240d may be omitted from the map service system 200 according to the exemplary embodiments of the present disclosure.

Figure 4:
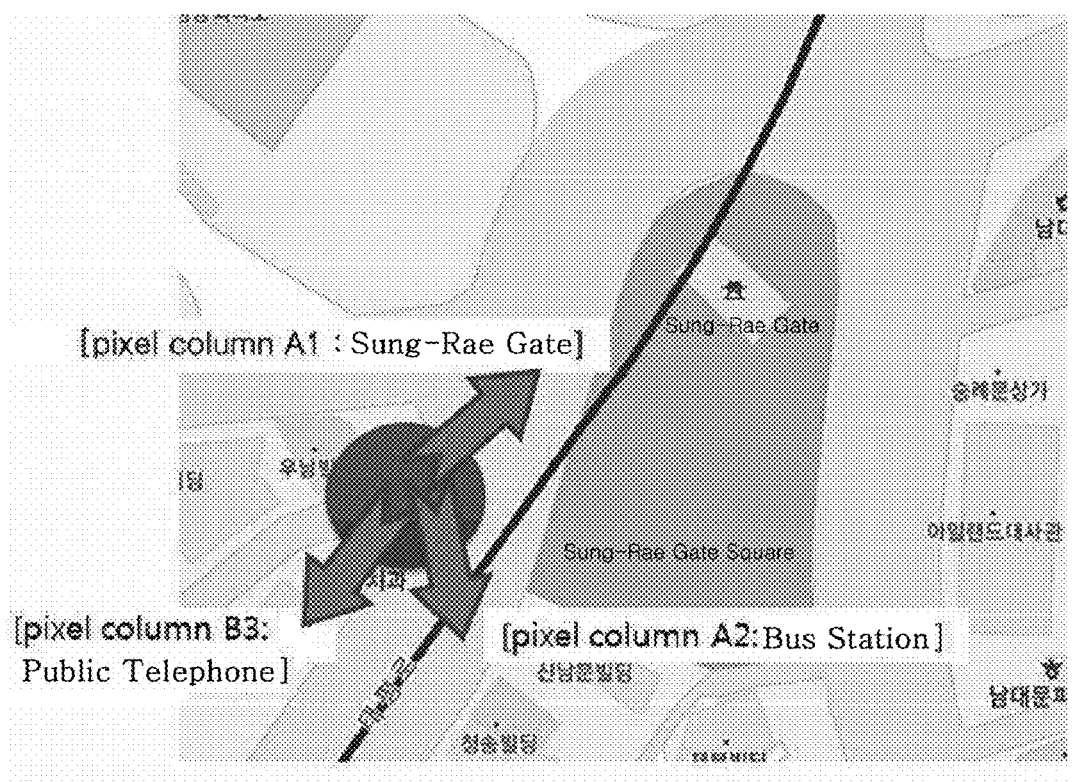
FIG. 4 shows one example of an electronic map, which includes icons associated with image data and is provided to a user terminal unit to determine a keyword corresponding to a pixel column of the image data.

FIG. 4 shows one example of an electronic map provided to the screen of the user terminal unit, in which keywords are determined corresponding to pixel columns of image data stored in association with the electronic map.

Referring to FIG. 4, for image data (not shown) associated with an icon "E" 295 in FIG. 2, it can be confirmed that a pixel column A1 is associated with the keyword "Sung-Rae Gate", a pixel column A2 is associated with a keyword "Bus Station", and a pixel column A3 is associated with a keyword "Public Telephone", so that the pixel columns constituting is single image data (not shown) are associated with different keywords.

Provision of Image Data Using Keyword

In an exemplary embodiment, upon receiving conditional information such as a search keyword input from the user terminal unit 300, the user interface module 210 may compare the conditional information with keywords associated with particular regions and may retrieve an electronic map of a region that includes a geographic feature or object corresponding to the search keyword, and may send the retrieved electronic map to the user terminal unit 300, to be displayed on the user terminal unit 300. Then, when the user searches for image data associated with the corresponding region, the user interface module 210 allows a pixel column corresponding to the search keyword to be preferentially displayed on the user terminal unit 300.

For example, when the search keyword "Sung-Rae Gate" is input from the user terminal unit 300, an electronic map as shown in FIG. 2 is provided to the user terminal unit 300. Then, when a user clicks or otherwise selects the icon "C" 293 to search for image data (not shown) associated with the icon "C" 293, the user interface module 210 allows a pixel column having orientation information of 270 degrees and pixel columns adjacent thereto to be preferentially displayed on the screen of the user terminal unit 300.

Figure 5:
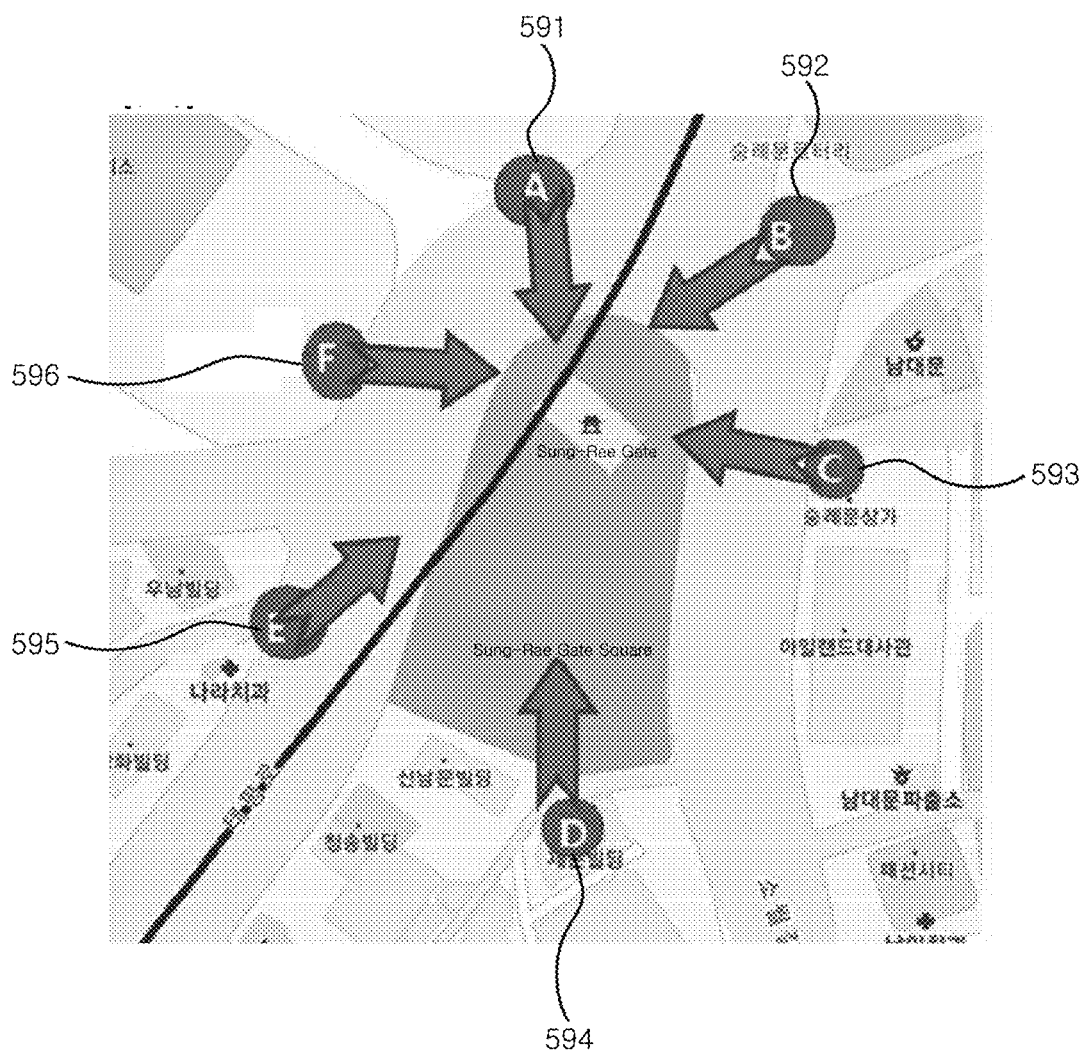
FIG. 5 shows one example of an electronic map, in which orientation information of particular pixel columns in image data preferentially provided to a user terminal unit is indicated by arrows.

FIG. 5 shows one example of an electronic map having orientation information of particular pixel columns in image data and preferentially displayed on the user terminal unit 300, in which the orientation information is indicated by arrows on the electronic map.

As described above, when a user clicks any of icons 591, 592, 593, 594, 595 and 596 after inputting "Sung-Rae Gate" as the search keyword, the pixel columns preferentially provided to the user terminal unit 300 are indicated by the corresponding arrows in FIG. 5. Specifically, if the user clicks an icon "A" 591, a pixel column having orientation information of 180 degrees and pixel columns adjacent thereto will be displayed on the user terminal unit 300, and if the user clicks an icon "B" 592, a pixel column having orientation information of 225 degrees and pixel columns adjacent thereto will be displayed on the user terminal unit 300.

In another exemplary embodiment, upon receiving a search keyword from the user terminal unit 300, the user interface module 210 may directly provide image data associated with the received keyword to the user terminal unit 300. That is, in this exemplary embodiment, it is contemplated that an image search service for providing image data is provided corresponding to a search keyword input by a user without the electronic map service.

Specifically, upon receiving the search keyword from the user terminal unit 300, the user interface module 210 may retrieve image data associated with the received search keyword from the keyword DB 240c and may allow a pixel column corresponding to the received search keyword from the user terminal unit 300 and pixel columns adjacent thereto to be preferentially displayed on the screen of the user terminal unit 300 when providing the retrieved image data to the user terminal unit 300.

The exemplary embodiments described above may be realized in the form of program instructions that can be implemented through various computer components, and may be recorded in a computer-readable recording medium. The computer-readable recording medium may include a program instruction, a data file, a data structure, and the like either alone or in combination. The program instruction recorded in the computer-readable recording medium may be any program instruction particularly designed and structured for the present disclosure or known to those skilled in the field of computer software.

Examples of the computer-readable recording medium include magnetic recording media such as hard disks, floppy disks and magnetic tapes, optical data storage media is such as CD-ROMs or DVD-ROMs, magneto-optical media such as floptical disks, and hardware devices, such as read-only memory (ROM), random-access memory (RAM), and flash memory, which are particularly structured to store and implement the program instruction.

Examples of the program instruction include not only a mechanical language code formatted by a compiler but also a high level language code which can be implemented by a computer using an interpreter.

The hardware devices may be configured to be operated by one or more software modules or vice versa to perform the processes according to the present disclosure.

According to the exemplary embodiments, a user can confirm an actual image of a selected place based on image data associated with the place displayed on an electronic map.

According to the exemplary embodiments, an actual image of a geographical feature or object that a user wishes to confirm can be displayed on a screen of a user terminal unit when the user inputs a keyword including content relating to the geographical feature or object, like, for example, identification information.

The various exemplary embodiments described above can be combined to provide further embodiments. All patents, patent application publications, patent applications, and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but is should be construed to include all possible embodiments along with the full scope of equivalents to which such claims are entitled. Accordingly, the claims are not limited by the disclosure.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A method of providing image data, comprising:
   receiving a request of image data of a region in association with a keyword, the image data comprising at least one pixel column;
   determining orientation information of the at least one pixel column;
   acquiring image data of at least one geographical feature or object corresponding to the determined orientation information of the at least one pixel column; and
   displaying the acquired image data of the region on a screen of a terminal unit.

2. The method of claim 1, wherein the image data is associated with a region of a map.

3. The method of claim 1, wherein the orientation information comprises azimuth information, and the keyword comprises identification information of a geographical feature or object located in an azimuth direction of the at least one pixel column with reference to the region of a map.

4. The method of claim 1, wherein the at least one pixel column comprises a shape of the image data.

5. The method of claim 4, further comprising:
recognizing the shape appearing in the image data;
determining identification information about the shape of the image data by using the keyword; and
storing the at least one pixel column in association with the keyword.

6. The method of claim 1, wherein displaying of the image data comprises:
determining a first region and a second region excluding the first region, the first region being a region of the image data to be displayed on the terminal unit; and
displaying the first region on the terminal unit,
wherein the first region comprises the requested region.

7. A method using a processor for providing relation between image data associated with a map and a keyword, the method comprising:
setting orientation information of a pixel column comprising image data;
acquiring region information of a map, the region information being associated with the image data; and
determining, by the processor, identification information of at least one geographical feature or object by using the region information and the orientation information, wherein
the pixel column is stored in association with a keyword related to the identification information of the at least one geographical feature or object.

8. The method of claim 7, further comprising:
comparing a shape comprising the pixel column with shape data corresponding to the identification information of the at least one geographical feature or object.

9. The method of claim 8, wherein the identification information of the at least one geographical feature or object associated with the pixel column comprises identification information corresponding to the shape data that corresponds to the shape comprising the pixel column.

10. A system for providing image data, comprising:
a keyword matching module to determine orientation information of at least one pixel column of image data of a region in response to detection of receiving a keyword; and
a user interface module to acquire image data of at least one geographical feature or object corresponding to the determined orientation information of the at least one pixel, and to display the acquired image data on a screen of a terminal unit.

11. A computer implemented system comprising a processor and a storage device for generating image data associated with a map and a keyword, the system comprising:
an orientation information setting module to set orientation information of a particular pixel column comprising image data; and
a keyword matching module, executed by the processor, to determine region information of a map, the region information being associated with the image data, to acquire identification information of at least one geographical feature or object by using the region information and the orientation information, and to store the pixel column in association with a keyword related to the identification information of the at least one geographical feature or object on the storage device.

12. A non-transitory computer-readable medium comprising an executable program which, when executed by a processor, performs the following method:
receiving a request of image data of a region in association with a keyword, the image date comprising at least one pixel column;
determining, by the processor, orientation information of the at least one pixel column;
acquiring image data corresponding to the orientation information of the at least one pixel column; and
displaying the acquired image data on a screen of a terminal unit.

13. A non-transitory computer-readable medium comprising an executable program which, when executed by a processor, performs the following method:
setting orientation information of a pixel column comprising image data;
acquiring region information of a map, the region information being associated with the image data; and
determining, by the processor, identification information of at least one geographical feature or object by using the region information and the orientation information, wherein
the pixel column is stored in association with a keyword related to the identification information of the at least one geographical feature or object.

* * * * *